US012645567B2

(12) United States Patent

Inoue

(10) Patent No.: US 12,645,567 B2

(45) Date of Patent: Jun. 2, 2026

(54) DEBUGGING COMMUNICATION AMONG UNITS ON PROCESSOR SIMULATOR

(71) Applicant: INTERNATIONAL BUSINESS MACHINES CORPORATION, Armonk, NY (US)

(72) Inventor: Hiroshi Inoue, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 483 days.

(21) Appl. No.: 17/547,757

(22) Filed: Dec. 10, 2021

(65) Prior Publication Data

US 2023/0185694 A1     Jun. 15, 2023

(51) Int. Cl.
    *G06F 11/362* (2025.01)
    *G06F 9/30* (2018.01)
    (Continued)

(52) U.S. Cl.
    CPC ...... *G06F 11/3636* (2013.01); *G06F 9/30058* (2013.01); *G06F 9/30134* (2013.01); *G06F 11/3457* (2013.01); *G06F 11/3698* (2025.01)

(58) Field of Classification Search
    CPC ............. G06F 11/3457; G06F 11/3636; G06F 11/3664; G06F 9/30058; G06F 9/30134; G06F 11/3698
    See application file for complete search history.

(56) References Cited

U.S. PATENT DOCUMENTS 5,058,114 A * 10/1991 Kuboki .................. G06F 11/348
                                                          714/45
5,255,238 A * 10/1993 Ichige ....................... G06F 5/10
                                                          365/220

(Continued)

FOREIGN PATENT DOCUMENTS

CN        101034384 A      9/2007
CN        109308180 A      2/2019
                (Continued)

OTHER PUBLICATIONS

S. Palacharla et al., "Decoupling integer execution in superscalar processors," 1995 [retrieved on Mar. 21, 2024], Proceedings of the 28th Annual International Symposium on Microarchitecture, pp. 285-290, <url>:https://ieeexplore.ieee.org. (Year: 1995).*

(Continued)

*Primary Examiner* — S. Sough
*Assistant Examiner* — Stephen D Berman
(74) *Attorney, Agent, or Firm* — CHIP LAW GROUP

(57)                    ABSTRACT

A method is provided for identifying a data transfer mismatch between a sender and a receiver from among units of a software simulator of a hardware processor. The simulator runs the plurality of the units which communicate with each other via First-In First-Outs (FIFOs). The method counts amounts of data the sender writes to the FIFOs and the receiver reads from the FIFOs for a given data transfer. The method avoids blocking during FIFO reading and writing operations by (i) reading dummy data by the receiver, even if the FIFOs are empty, when the receiver tries reading from the FIFOs, and (ii) discarding written data if the FIFOs are full, when the sender tries writing to the FIFOs. The method identifies mismatches in the amount of data the sender writes to the FIFOs versus the amount of data the receiver reads from the FIFOs for the given data transfer.

20 Claims, 7 Drawing Sheets

(51) Int. Cl.
　　*G06F 11/34*　　　　(2006.01)
　　*G06F 11/3698*　　　(2025.01)

(56)　　　　　References Cited

U.S. PATENT DOCUMENTS

| | | | | |
|---|---|---|---|---|
| 5,353,285 | A | * | 10/1994 | Van Der Plas ....... H04J 3/1694 |
| | | | | 370/468 |
| 6,687,255 | B1 | * | 2/2004 | Holm ...................... H04L 49/90 |
| | | | | 710/33 |
| 7,437,692 | B2 | | 10/2008 | Oberlaender |
| 2003/0147165 | A1 | * | 8/2003 | Damron ............. G11B 20/1816 |
| | | | | 360/39 |
| 2004/0068685 | A1 | * | 4/2004 | Yuan ................ G01R 31/31907 |
| | | | | 714/741 |
| 2005/0081003 | A1 | * | 4/2005 | Hurley ...................... G06F 5/14 |
| | | | | 711/E12.072 |
| 2005/0102572 | A1 | * | 5/2005 | Oberlaender .......... G06F 30/33 |
| | | | | 714/29 |
| 2007/0011656 | A1 | | 1/2007 | Kumamoto |
| 2008/0112423 | A1 | * | 5/2008 | Christenson ............ H04L 49/90 |
| | | | | 370/252 |
| 2008/0244506 | A1 | * | 10/2008 | Killian ...................... G06F 8/20 |
| | | | | 717/100 |
| 2010/0325334 | A1 | * | 12/2010 | Tsai ........................ G06F 15/17 |
| | | | | 710/308 |
| 2011/0185153 | A1 | | 7/2011 | Henry et al. |
| 2013/0346637 | A1 | | 12/2013 | Zadigian et al. |
| 2018/0341484 | A1 | * | 11/2018 | Fowers ................. G06F 9/3016 |
| 2021/0373895 | A1 | * | 12/2021 | Shahim ................... G06F 3/061 |
| 2022/0382592 | A1 | * | 12/2022 | Zhang ................... G06F 9/4881 |

FOREIGN PATENT DOCUMENTS

| | | |
|---|---|---|
| CN | 112035391 A | 12/2020 |
| WO | 2023/103793 A1 | 6/2023 |

OTHER PUBLICATIONS

H. Kim et al., "Wish branches: combining conditional branching and predication for adaptive predicated execution," 2005 [retrieved on Mar. 21, 2024], 38th Annual IEEE/ACM International Symposium on Microarchitecture, pp. 1-12, <url>:https://ieeexplore.ieee.org. (Year: 2005).*

Jouppi et al., "In-Datacenter Performance Analysis of a Tensor Processing Unit," Jun. 24, 2017 [retrieved Aug. 28, 2025], pp. 1-12, downlaoded from <url>:https://dl.acm.org/doi/abs/10.1145/3079856.3080246. (Year: 2017).*

Clifford Cummings, "Simulation and Synthesis Techniques for Asynchronous FIFO Design", 2002 [retrieved Jan. 10, 2026], pp. 1-23, downloaded from <url>:https://www.researchgate.net. (Year: 2002).*

Debapriya Chatterjee et al., "Checking architectural outputs instruction-by-instruction on acceleration platforms", 2012 [retrieved Jan. 10, 2026], DAC '12: Proceedings of the 49th Annual Design Automation Conference, pp. 955-961, downloaded from <url>: https://dl.acm.org/doi/abs/10.1145/2228360.2228531. (Year: 2012).*

Mell et al., "The NIST Definition of Cloud Computing", National Institute of Standards and Technology, Special Publication 800-145. Sep. 2011, pp. 1-7.

Gao, Qi, et al. "Dmtracker: finding bugs in large-scale parallel programs by detecting anomaly in data movements", InSC'07: Proceedings of the 2007 ACM/IEEE conference on Supercomputing. Nov. 10, 2007, pp. 1-12.

Wang, Haixia, et al. "Acceleration techniques for chip-multiprocessor simulator debug", InAsia-Pacific Conference on Advances in Computer Systems Architecture, Springer, Berlin, Heidelberg. Sep. 6, 2006, pp. 509-515.

International Search Report from PCT/CN2022/133975 dated Jan. 19, 2023. (9 pages).

* cited by examiner

Ixiu
220

Ixsu
230 sfp
210 pe
210

Pt0
210

Pt1
210

Pt7
210

IOsu
230

IOiu0
220

IOiu1
220

IOiu7
220

654C

654N

650

610

654A

654B

DEBUGGING COMMUNICATION AMONG UNITS ON PROCESSOR SIMULATOR

BACKGROUND

The present invention generally relates to computer processing systems, and more particularly to debugging communication among units on processor simulator.

When developing a new processor, such as a new deep learning hardware accelerator, a software simulator of the processor is often used to develop software before the hardware becomes ready.

While the processor is under development, the instruction set (ISA) of the processor is frequently changed. The simulator and all development tools must be updated according to the changing ISA. Such a situation yields a high development cost for the software. Hence, there is a need for an efficient way to debug communication among units on a processor simulator.

SUMMARY

According to aspects of the present invention, a computer-implemented method is provided for identifying a data transfer mismatch between a sender and a receiver from among a plurality of units of a software simulator of a hardware processor lacking data-dependent conditional branch support. The software simulator runs the plurality of the units which communicate with each other via First-In First-Outs (FIFOs). The method includes counting amounts of data the sender writes to the FIFOs and the receiver reads from the FIFOs for a given data transfer. The method further includes avoiding blocking during reading and writing operations with respect to the FIFOs by (i) reading dummy data by the receiver, even if the FIFOs are empty, when the receiver tries reading from the FIFOs, and (ii) discarding written data if the FIFOs are full, when the sender tries writing to the FIFOs. The method also includes identifying mismatches in the amount of data the sender writes to the FIFOs versus the amount of data the receiver reads from the FIFOs for the given data transfer.

According to other aspects of the present invention, a computer program product is provided for identifying a data transfer mismatch between a sender and a receiver from among a plurality of units of a software simulator of a hardware processor lacking data-dependent conditional branch support. The software simulator runs the plurality of the units which communicate with each other via First-In First-Outs (FIFOs). The computer program product includes a non-transitory computer readable storage medium having program instructions embodied therewith. The program instructions are executable by the computer to cause the computer to perform a method. The method includes counting, by the hardware processor, amounts of data the sender writes to the FIFOs and the receiver reads from the FIFOs for a given data transfer. The method further includes avoiding blocking, by the hardware processor, during reading and writing operations with respect to the FIFOs by (i) reading dummy data by the receiver, even if the FIFOs are empty, when the receiver tries reading from the FIFOs, and (ii) discarding written data if the FIFOs are full, when the sender tries writing to the FIFOs. The method also includes identifying, by the hardware processor, mismatches in the amount of data the sender writes to the FIFOs versus the amount of data the receiver reads from the FIFOs for the given data transfer.

According to yet other aspects of the present invention, a computer processing system is provided for identifying a data transfer mismatch between a sender and a receiver from among a plurality of units of a software simulator of a hardware processor lacking data-dependent conditional branch support. The software simulator runs the plurality of the units which communicate with each other via First-In First-Outs (FIFOs). The system includes a memory device for storing program code. The system further includes a processor device, operatively coupled to the memory device, for running the program code to count amounts of data the sender writes to the FIFOs and the receiver reads from the FIFOs for a given data transfer. The processor device further runs the program code to avoiding blocking during reading and writing operations with respect to the FIFOs by (i) reading dummy data by the receiver, even if the FIFOs are empty, when the receiver tries reading from the FIFOs, and (ii) discarding written data if the FIFOs are full, when the sender tries writing to the FIFOs. The processor device also runs the program code to identify mismatches in the amount of data the sender writes to the FIFOs versus the amount of data the receiver reads from the FIFOs for the given data transfer.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention are directed to debugging communication among units on processor simulator.

In one or more embodiments of the present invention, the target is a simulator of a processor, in which all units (computation units, load units, store units, etc.) communicate with each other by messaging (data or synchronization) via FIFOs. In an embodiment, each FIFO has only one sender and one receiver.

Each unit does not support data-dependent conditional branches, as common in simplified Instruction Set Architectures (ISAs) of accelerators. Non-data-dependent conditional branches (e.g., on a loop counter) can be used.

Figure 1:
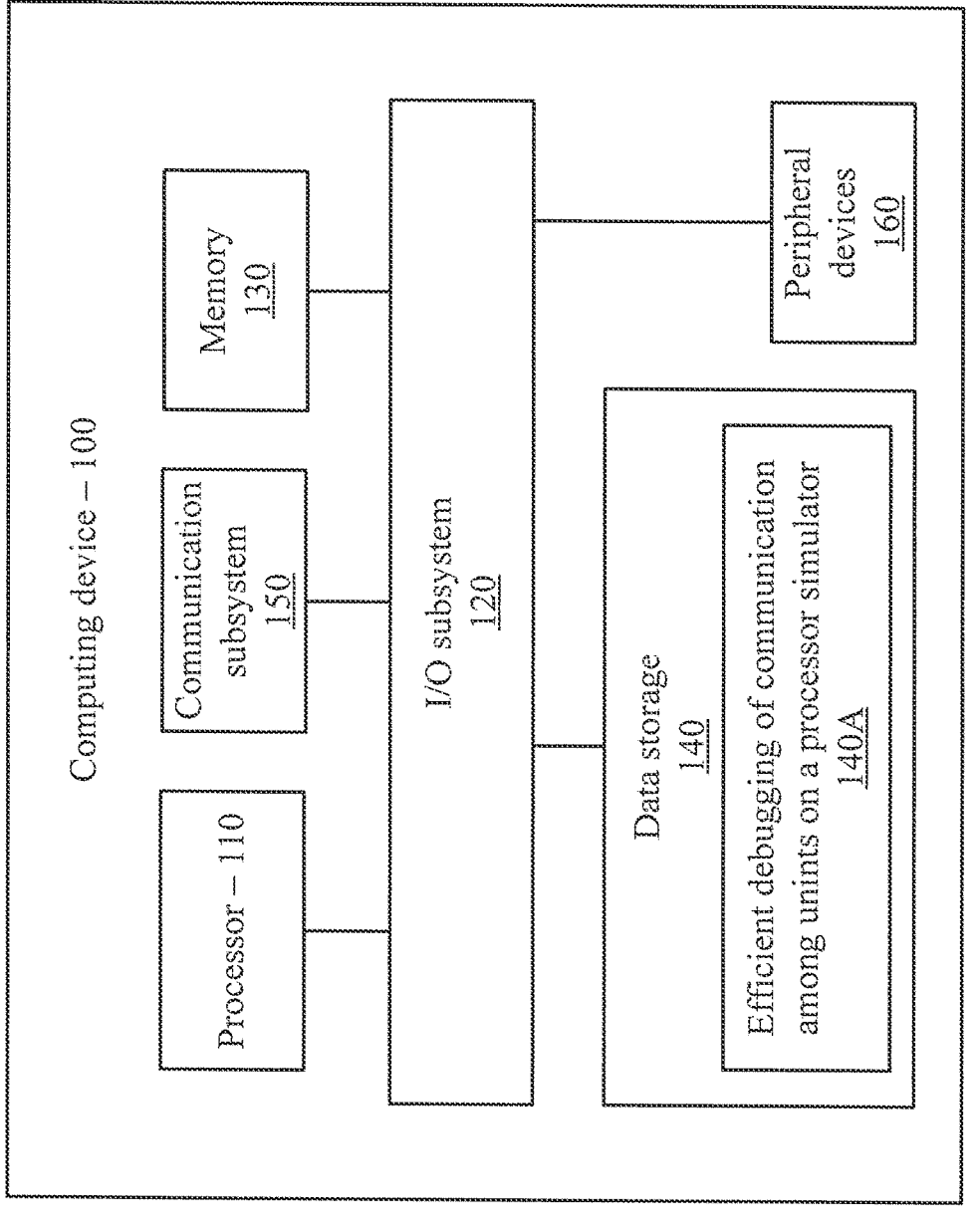
FIG. 1 is a block diagram showing an exemplary computing device, in accordance with an embodiment of the present invention.

Target programs process a fixed amount of data (e.g., based on a tensor size). Embodiments of the present invention are directed to non-streaming programs whose data size is fixed before the execution FIG. 1 is a block diagram showing an exemplary computing device 100, in accordance with an embodiment of the present invention. The computing device 100 is configured to perform efficient debugging of communication among units on a processor simulator.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s). In any event, the processor 110 is suitable for simulating a hardware accelerator and its functions for given application program simulations. In an embodiment, the units (computation, load, store) of the processor communicate via FIFOs. In an embodiment, the FIFOs include hardware shift registers.

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for efficient debugging of communication among units on a processor simulator. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. Further, in another embodiment, a cloud configuration can be used (e.g., see FIGS. 6-7). These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention When a program runs on many units that communicate via FIFOs each other, the execution is blocked if there is mismatch in amount of data between sender and receiver. Once a pair of units stops due to such mismatch, typically all units stop due to cyclic dependency among units. In such case, it is hard to identify where the mismatch is.

Figure 2:
FIG. 2 is a block diagram showing exemplary unit dependencies, in accordance with an embodiment of the present invention.

FIG. 2 is a block diagram showing exemplary unit dependencies 200, in accordance with an embodiment of the present invention. The unit dependencies 200 relate to a hardware accelerator with one core.

The unit dependencies 200 involve compute units 210, load units 220, and store units 230. Single-headed arrows pertain to a data transfer, while double-headed arrows pertain to synchronization. In particular, compute units 210 include: pt0 through pt7; sfp; and pe. The load units 220 include: I0Iu0 through I0Iu7; and IxIu. The store units 230 include: I0su; and Ixsu.

If there is a mismatch between the sender and the receiver in one of the FIFOs, the mismatch makes all units unable to proceed due to cyclic dependency. The location of the mismatch is not obvious from the execution log.

Figure 3:
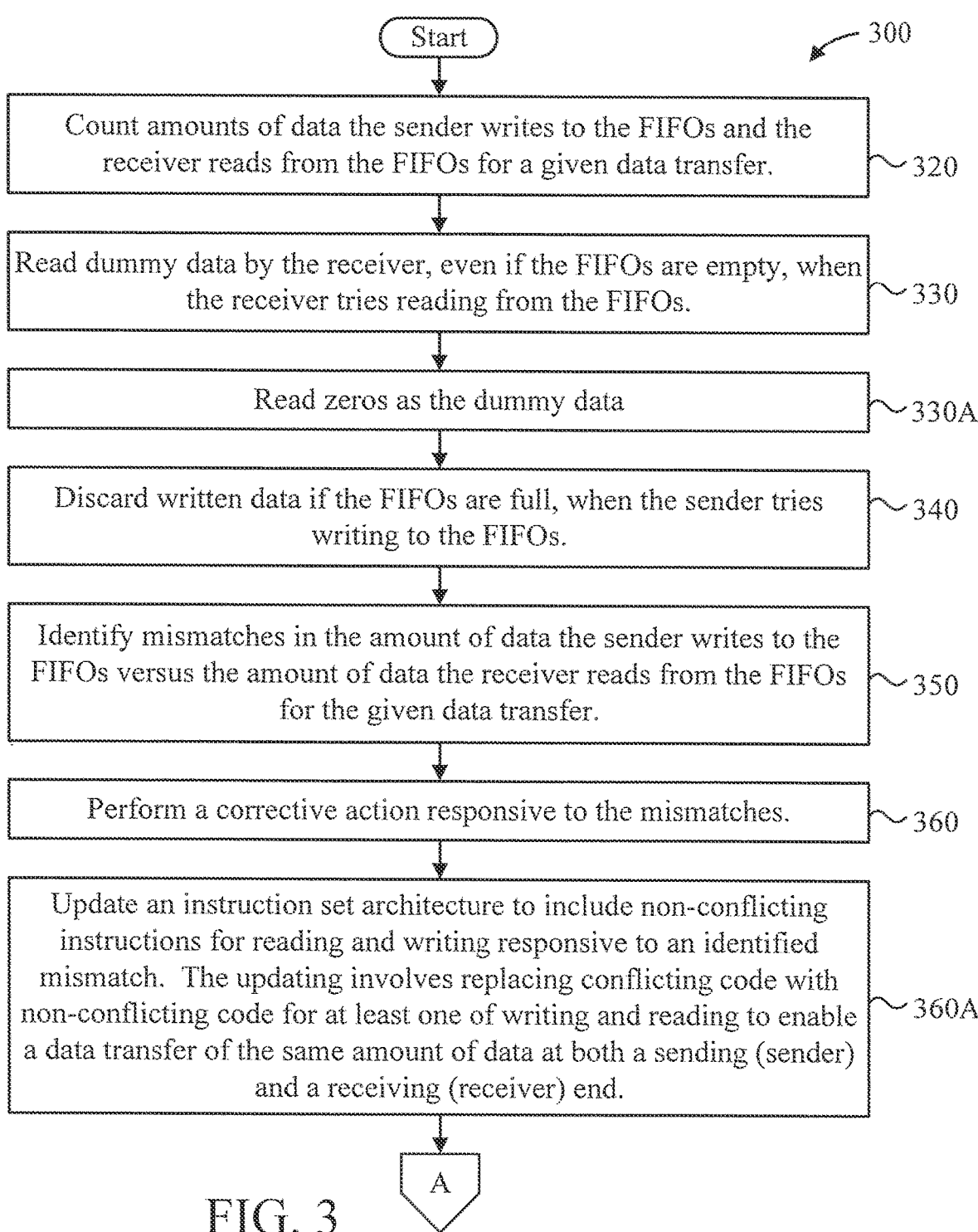
FIGS. 3-4 are flow diagram showing an exemplary method for identifying a data transfer mismatch between at least some of a plurality of units of a software simulator of a hardware processor lacking data-dependent conditional branch support, in accordance with an embodiment of the present invention.
Figure 4:
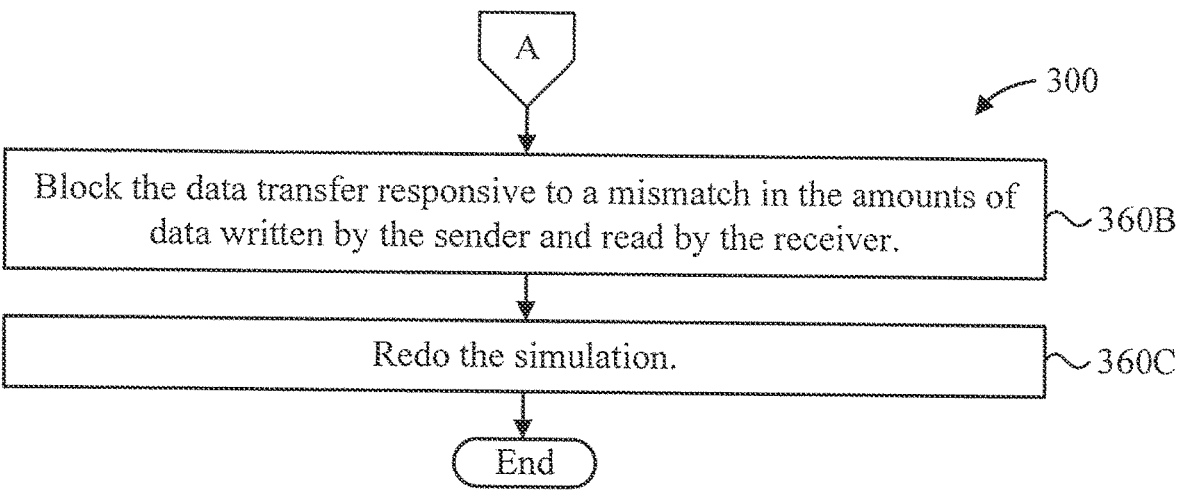

FIGS. 3-4 are flow diagram showing an exemplary method 300 for identifying a data transfer mismatch between a sender and a receiver from among a plurality of units of a software simulator of a hardware processor lacking data-dependent conditional branch support, wherein the software simulator runs the plurality of the units which communicate with each other via First-In First-Outs (FIFOs). Each of the FIFOs has only one sender and one receiver. At least one of the units can support one or more non-data-dependent conditional branches. The units can include any of computation units, load units, and/or store units. The units can also include other types of units. The method is constrained to processing a fixed amount of data known prior to an execution time. The fixed amount of data can be based on an input tensor size. Lacking data-dependent conditional branch support means direction of all conditional branches must be known before execution. Otherwise, this technique does not work correctly.

At block 320, count amounts of data the sender writes to the FIFOs and the receiver reads from the FIFOs for a given data transfer.

At block 330, read dummy data by the receiver, even if the FIFOs are empty, when the receiver tries reading from the FIFOs. It is to be appreciated that the receiver never stop execution when reading a FIFO. If a unit stops, then all other units also stop due to dependencies; that makes debugging (i.e., identifying the unit that stops first) very difficult.

In an embodiment, block 330 can include block 330A.

At block 330A, read zeros as the dummy data.

At block 340, discard written data if the FIFOs are full, when the sender tries writing to the FIFOs. It is to be appreciated that the sender never stop execution when writing a FIFO.

At block 350, identify mismatches in the amount of data the sender writes to the FIFOs versus the amount of data the receiver reads from the FIFOs for the given data transfer.

At block 360, perform a corrective action responsive to the mismatches.

In an embodiment, block 360 can include one or more of blocks 360A through 360C.

At block 360A, update an instruction set architecture to include non-conflicting instructions for reading and writing responsive to an identified mismatch. The updating involves replacing conflicting code with non-conflicting code for at least one of writing and reading to enable a data transfer of the same amount of data at both a sending (sender) and a receiving (receiver) end.

At block 360B, block the data transfer responsive to a mismatch in the amounts of data written by the sender and read by the receiver.

At block 360C, redo the simulation in the hope that the mismatch does not again occur.

Figure 5:
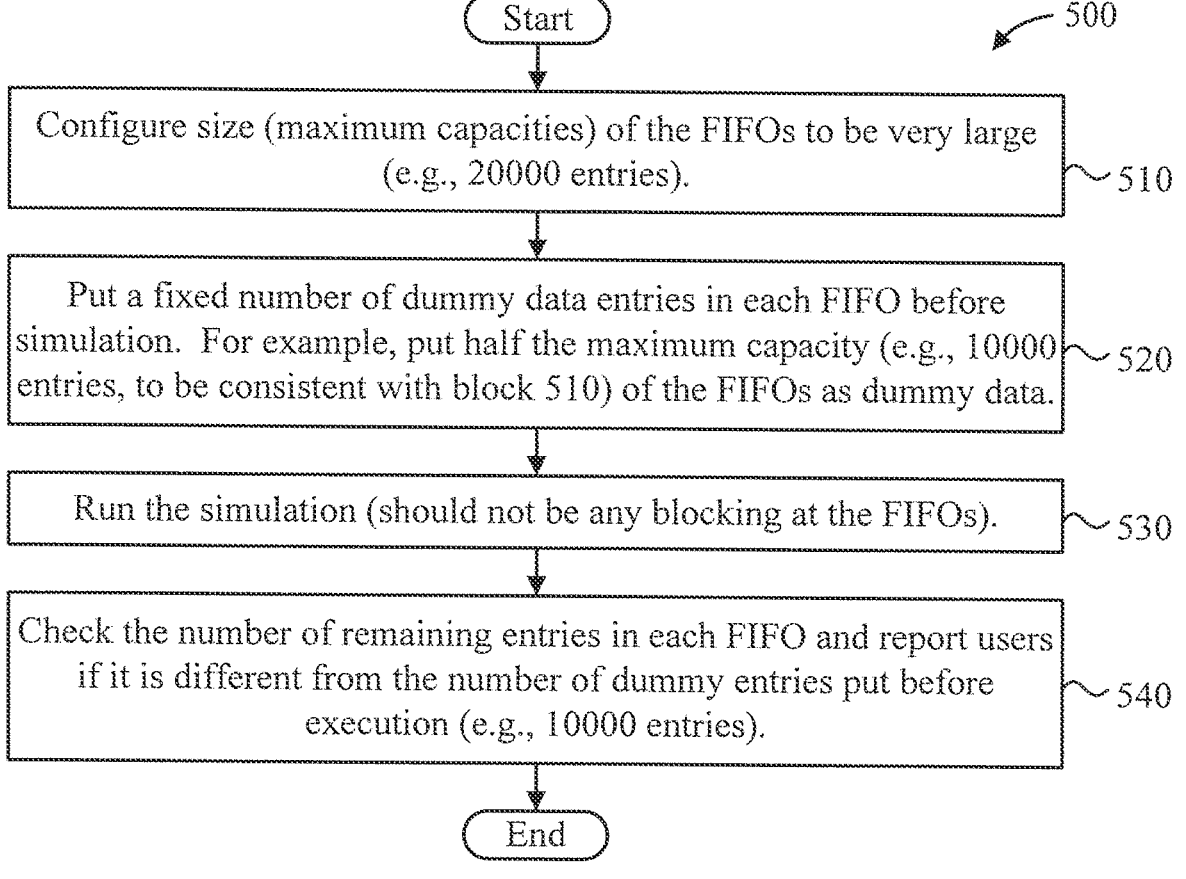
FIG. 5 is a block diagram showing an exemplary method 500 for FIFO management, in accordance with an embodiment of the present invention.

FIG. 5 is a block diagram showing an exemplary method 500 for FIFO management, in accordance with an embodiment of the present invention.

At block 510, configure size (maximum capacities) of the FIFOs to be a set size, e.g., very large (e.g., 20000 entries).

At block 520, put a fixed number of dummy data entries in each FIFO before simulation. For example, put half the maximum capacity (e.g., 10000 entries, to be consistent with block 510) of the FIFOs as dummy data.

At block 530, run the simulation (which should run without blocking at the FIFOs).

At block 540, check the number of remaining entries in each FIFO and report users if it is different from the number of dummy entries put before execution (e.g., 10000 entries).

In an embodiment, efficient debugging of communication among units on a processor simulator can be performed in the cloud. In an embodiment, a cloud-based debugging service can be provided in the cloud. In this way, simulations can be performed for new hardware accelerators considering being added to a given cloud architecture in order to detect bugs therein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
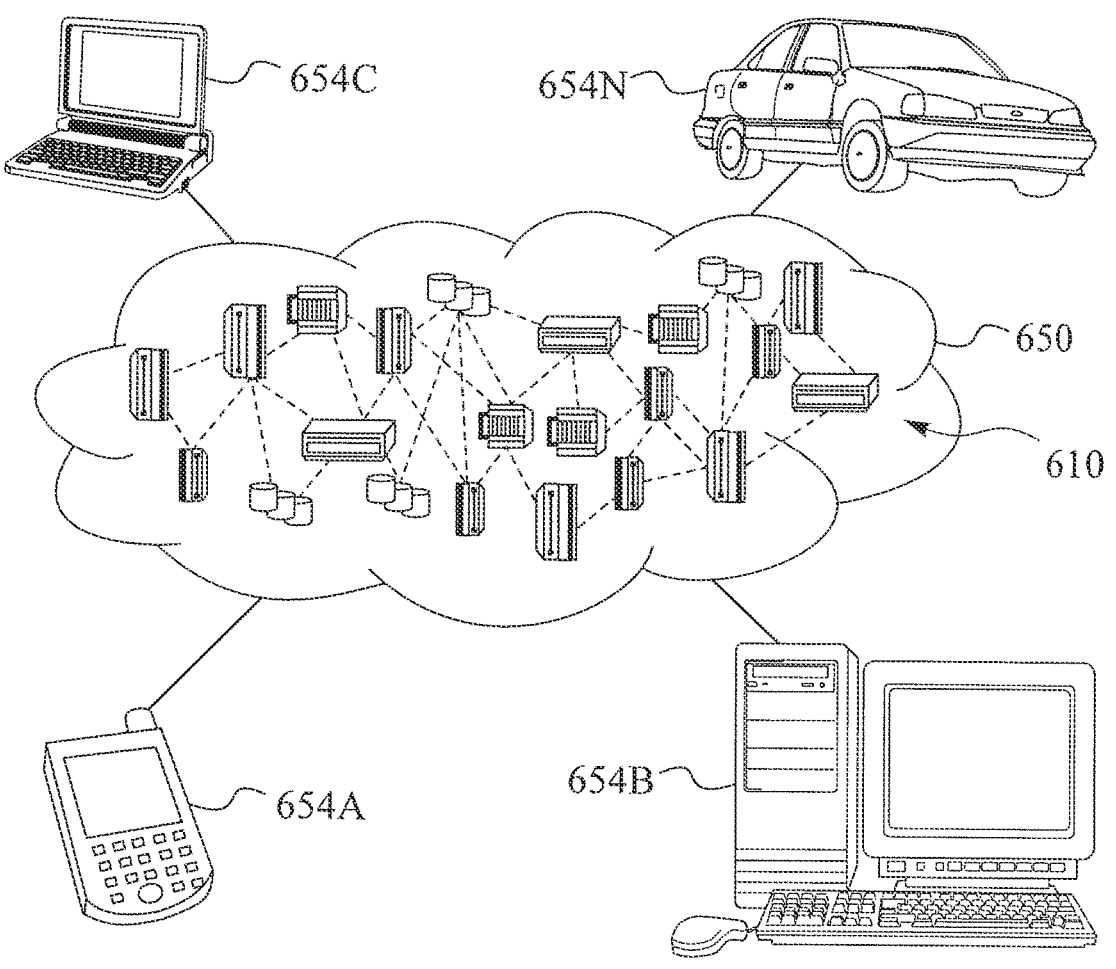
FIG. 6 is a block diagram showing an illustrative cloud computing environment having one or more cloud computing nodes with which local computing devices used by cloud consumers communicate, in accordance with an embodiment of the present invention.

Referring now to FIG. 6, illustrative cloud computing environment 650 is depicted. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
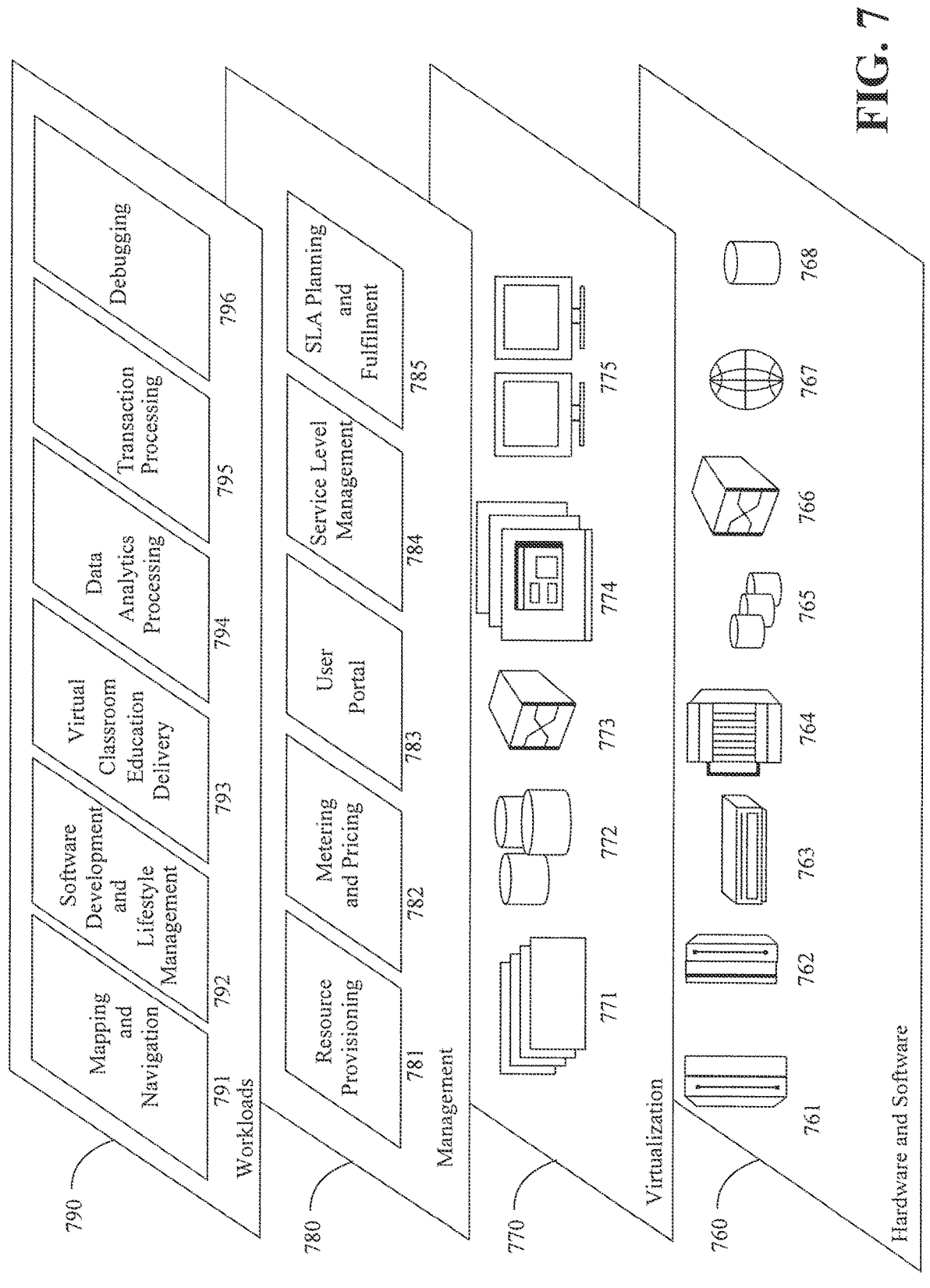
FIG. 7 is a block diagram showing a set of functional abstraction layers provided by a cloud computing environment, in accordance with an embodiment of the present invention.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and efficient user-level threading for simulating a multi-core processor 796.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method comprising:
identifying a data transfer mismatch between a sender and a receiver from among a plurality of units of a software simulator of a hardware processor lacking data-dependent conditional branch support, wherein the software simulator runs the plurality of the units which communicate with each other via First-In First-Outs (FIFOs) by:
counting amounts of data the sender writes to the FIFOs and amounts of data the receiver reads from the FIFOs for a given data transfer, the amounts of data the sender writes to the FIFOs and the amounts of data the receiver reads from the FIFOs being known prior to execution time;
avoiding blocking during reading and writing operations with respect to the FIFOs by (i) reading dummy data by the receiver, even if the FIFOs are empty, when the receiver tries reading from the FIFOs, and (ii) discarding written data if the FIFOs are full, when the sender tries writing to the FIFOs; and

identifying mismatches in the amounts of data the sender writes to the FIFOs versus the amounts of data the receiver reads from the FIFOs for the given data transfer; and
performing a corrective action including updating an instruction set architecture in response to the mismatches in the amounts of data.

2. The computer-implemented method of claim 1, wherein the dummy data consists of zeros.

3. The computer-implemented method of claim 1, wherein at least one of the plurality of units supports one or more non-data-dependent conditional branches.

4. The computer-implemented method of claim 1, further comprising the updating including non-conflicting instructions for reading and writing responsive to an identified mismatch, the updating involving replacing conflicting code with non-conflicting code for at least one of the writing and reading.

5. The computer-implemented method of claim 1, wherein the plurality of units comprise computation units, load units, and store units.

6. The computer-implemented method of claim 1, wherein each of the FIFOs has only one sender and one receiver for performing the given data transfer.

7. The computer-implemented method of claim 1, wherein a fixed amount of data is based on an input tensor size.

8. The computer-implemented method of claim 1, wherein the software simulator runs the plurality of the units which communicate with each other via the FIFOs for the given data transfer and for a data synchronization.

9. The computer-implemented method of claim 1, further comprising blocking the given data transfer responsive to a mismatch in the amounts of data written by the sender and read by the receiver.

10. The computer-implemented method of claim 1, wherein the FIFOs comprise hardware shift registers.

11. A computer program product, the computer program product comprising a non-transitory computer readable storage medium having program instructions embodied therewith, the program instructions executable by a computer to cause the computer to perform a method comprising:
identifying a data transfer mismatch between a sender and a receiver from among a plurality of units of a software simulator of a hardware processor lacking data-dependent conditional branch support, wherein the software simulator runs the plurality of the units which communicate with each other via First-In First-Outs (FIFOs) by:
counting, by the hardware processor, amounts of data the sender writes to the FIFOs and amounts of data the receiver reads from the FIFOs for a given data transfer, the amounts of data the sender writes to the FIFOs and the amounts of data the receiver reads from the FIFOs being known prior to execution time;
avoiding blocking, by the hardware processor, during reading and writing operations with respect to the FIFOs by (i) reading dummy data by the receiver, even if the FIFOs are empty, when the receiver tries reading from the FIFOs, and (ii) discarding written data if the FIFOs are full, when the sender tries writing to the FIFOs; and
identifying, by the hardware processor, mismatches in the amounts of data the sender writes to the FIFOs versus the amounts of data the receiver reads from the FIFOs for the given data transfer; and performing a corrective action including updating an instruction set architecture in response to the mismatches in the amounts of data.

12. The computer program product of claim 11, wherein the hardware processor comprises a deep learning hardware accelerator.

13. The computer program product of claim 11, wherein the dummy data consists of zeros.

14. The computer program product of claim 11, wherein at least one of the plurality of units supports one or more non-data-dependent conditional branches.

15. The computer program product of claim 11, wherein the method further comprises blocking the given data transfer responsive to a mismatch in the amounts of data written by the sender and read by the receiver.

16. The computer program product of claim 11, wherein the updating includes non-conflicting instructions for reading and writing responsive to an identified mismatch, the updating involving replacing conflicting code with non-conflicting code for at least one of the writing and reading.

17. A computer processing system comprising:
a memory device storing program code; and
a processor device, operatively coupled to the memory device, for running the program code to:
identify a data transfer mismatch between a sender and a receiver from among a plurality of units of a software simulator of a hardware processor lacking data-dependent conditional branch support, wherein the software simulator runs the plurality of the units which communicate with each other via First-In First-Outs (FIFOs), by having the processor device:

count amounts of data the sender writes to the FIFOs and amounts of data the receiver reads from the FIFOs for a given data transfer, the amounts of data the sender writes to the FIFOs and the amounts of data the receiver reads from the FIFOs being known prior to execution time;
avoid blocking during reading and writing operations with respect to the FIFOs by (i) reading dummy data by the receiver, even if the FIFOs are empty, when the receiver tries reading from the FIFOs, and (ii) discarding written data if the FIFOs are full, when the sender tries writing to the FIFOs; and
identify mismatches in the amounts of data the sender writes to the FIFOs versus the amounts of data the receiver reads from the FIFOs for the given data transfer; and
perform a corrective action including updating an instruction set architecture in response to the mismatches in the amounts of data.

18. The computer processing system of claim 17, wherein the processor device is further configured to block the given data transfer responsive to a mismatch in the amounts of data written by the sender and read by the receiver.

19. The computer processing system of claim 17, wherein the FIFOs comprise hardware shift registers.

20. The computer processing system of claim 17, wherein the updating includes non-conflicting instructions for reading and writing responsive to an identified mismatch, the update replacing conflicting code with non-conflicting code for at least one of the writing and reading.

* * * * *